US 6,603,763 B1

(12) United States Patent
Koshino

(10) Patent No.: US 6,603,763 B1
(45) Date of Patent: *Aug. 5, 2003

(54) SYSTEM AND METHOD FOR COMMUNICATING BETWEEN A MOBILE STATION AND A NETWORK USING ADDRESS ASSIGNMENT

(75) Inventor: Katsuhide Koshino, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,909

(22) Filed: Apr. 28, 1998

(30) Foreign Application Priority Data

Apr. 28, 1997 (JP) .............................. 9-111184

(51) Int. Cl.$^7$ ................................. H04B 7/26
(52) U.S. Cl. ...................... 370/389; 370/392
(58) Field of Search ............... 370/312, 315, 370/328, 338, 351, 389, 392, 400, 401, 409, 428, 912, 913; 379/912, 913; 455/422, 432, 433, 435, 445, 446, 461; 709/245; 713/154

(56) References Cited

U.S. PATENT DOCUMENTS

| | | | | |
|---|---|---|---|---|
| 5,790,548 A | * | 8/1998 | Sistanizadeh et al. | 370/401 |
| 5,894,479 A | * | 4/1999 | Mohammed | 370/401 |
| 5,946,615 A | * | 8/1999 | Holmes et al. | 455/412 |
| 6,058,431 A | * | 5/2000 | Srisuresh et al. | 709/245 |
| 6,128,298 A | * | 10/2000 | Wootton et al. | 370/392 |
| 6,128,664 A | * | 10/2000 | Yanagidate et al. | 370/389 |
| 6,154,839 A | * | 11/2000 | Arrow et al. | 713/154 |
| 6,188,899 B1 | * | 2/2001 | Chatterjee et al. | 455/435 |
| 6,442,616 B1 | * | 8/2002 | Inoue et al. | 455/432 |

FOREIGN PATENT DOCUMENTS

| | | | |
|---|---|---|---|
| EP | 0 483 547 | 5/1992 | |
| EP | 0 658 023 | 6/1995 | |
| JP | 4-227149 | 8/1992 | |
| WO | WO 95/27942 | 10/1995 | |
| WO | WO 97/05727 | * 2/1997 | H04I/29/06 |

OTHER PUBLICATIONS

D. Cohen, J.B. Postel and R. Rom, IP Addressing and Routing in a Local Wireless Network, 1992 Infocom' 92.

* cited by examiner

Primary Examiner—Salvatore Cangialosi
(74) Attorney, Agent, or Firm—Sughrue Mion, PLLC

(57) ABSTRACT

In a communication method between the Internet and a mobile station, when transmitting an outgoing signal to the Internet, a private address is assigned to the mobile station which has transmitted the outgoing signal to a switching device. The private address is selected from a group of private addresses uniquely assigned to the switching device. A first correspondence of the private address and the ID number of the mobile station is stored. After converting the private address to a unique network address as a source address, a second correspondence of the unique network address and the private address is stored. The first and second correspondences are used to transfer an incoming signal received from the Internet to the mobile station through a switching device.

7 Claims, 12 Drawing Sheets

FIG. 4A

MEMORY 103

| GLOBAL IP ADDRESS | PRIVATE IP ADDRESS |
|---|---|
| g1 | a1 |
| g2 | a2 |
| g3 | a3 |
| g4 | b1 |
| g5 | b2 |
| g6 | b3 |
| g7 | b4 |
| g8 | c1 |
| g9 | c2 |
| g10 | UNUSED |
| g11 | UNUSED |

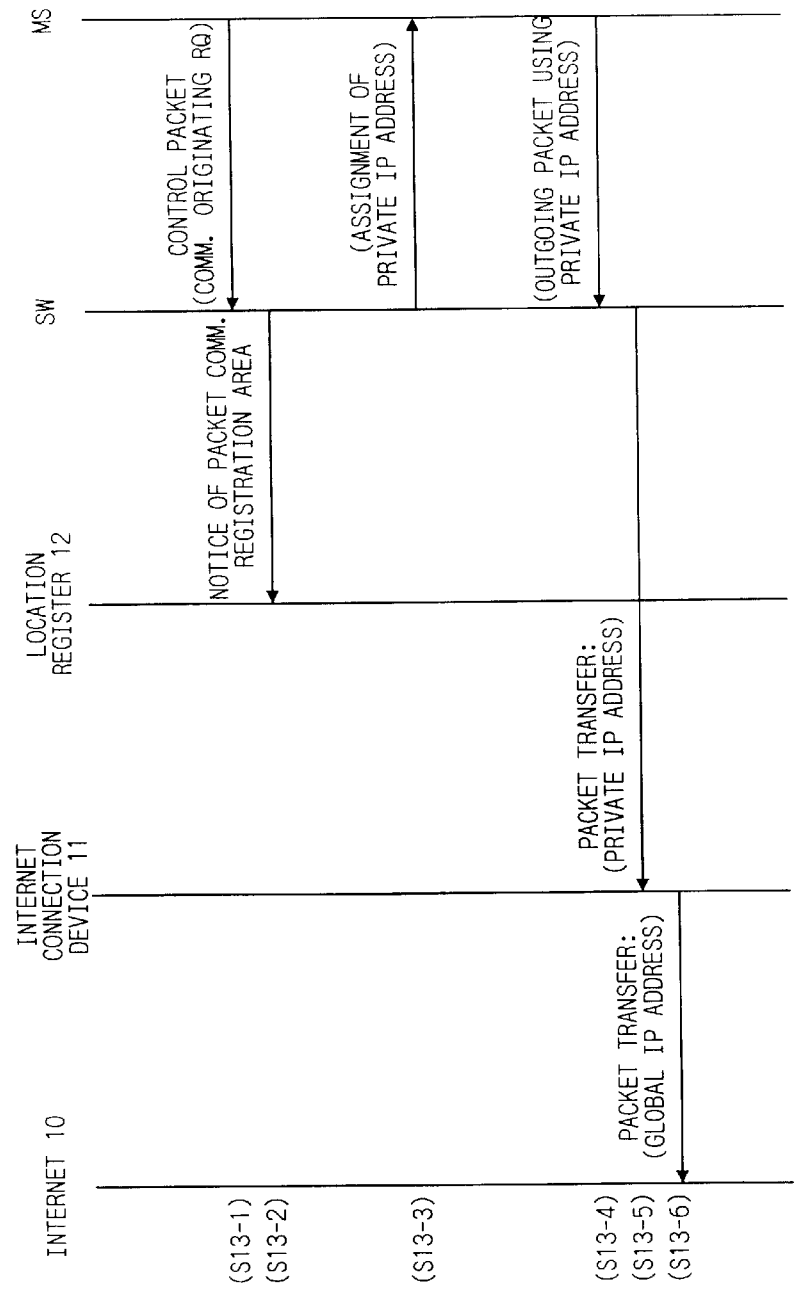

| INCOMING PACKET FROM INTERNET | | | | INCOMING PACKET TO MS | | |
|---|---|---|---|---|---|---|
| DATA | DESTINATION "g₂" | SOURCE "a" | → | DATA | DESTINATION "a2" | SOURCE "a" |

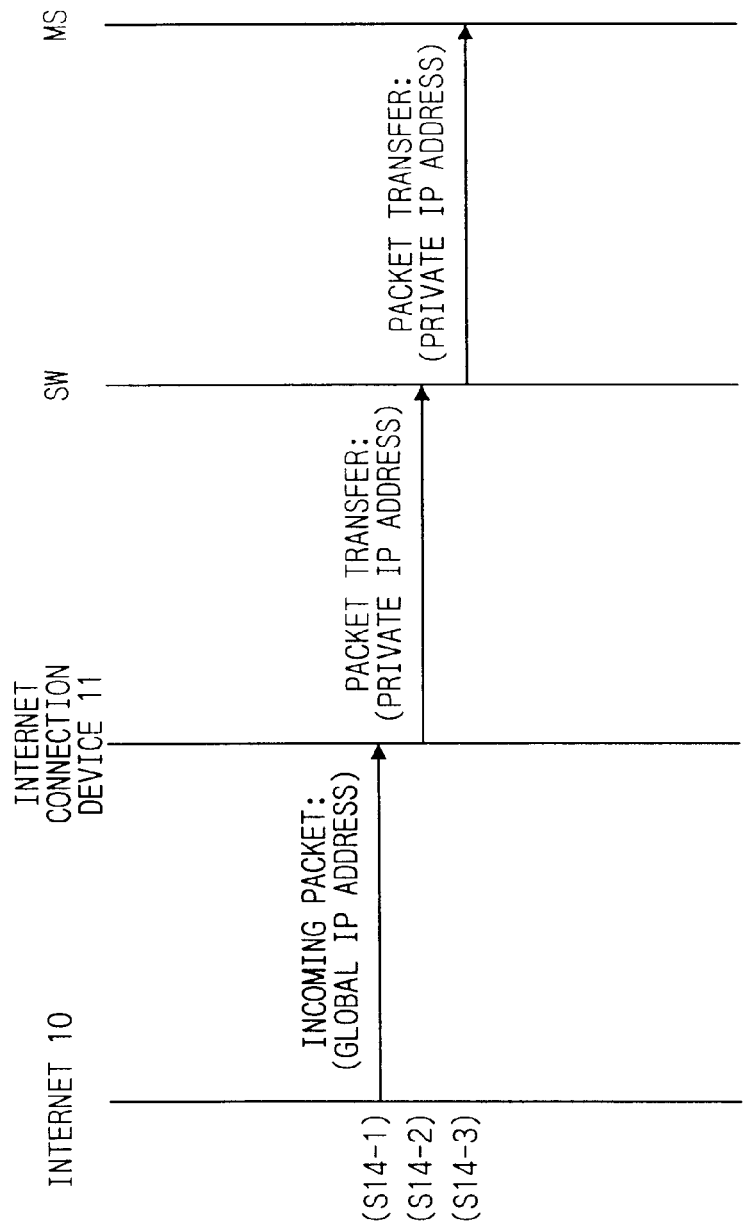

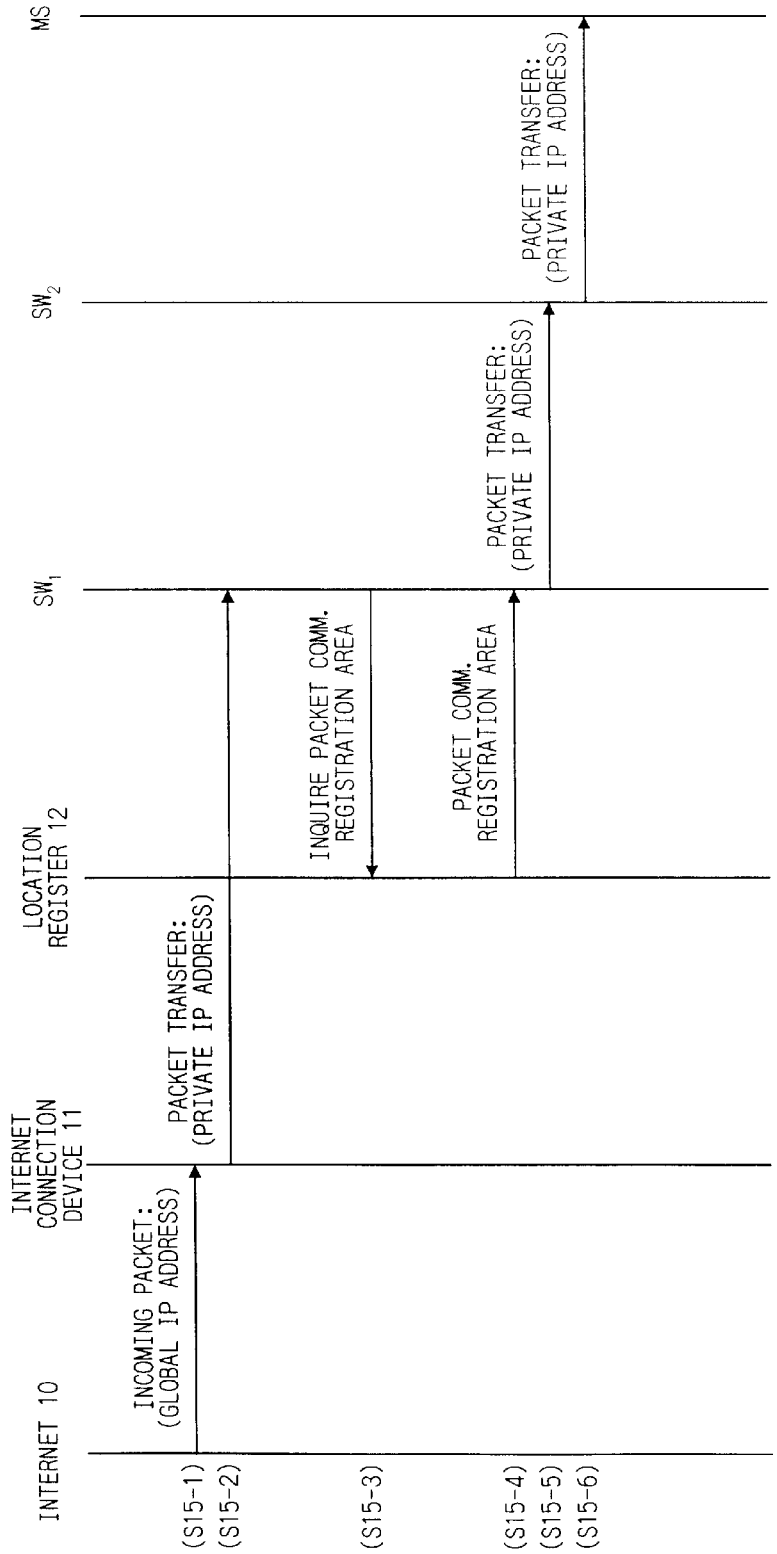

SYSTEM AND METHOD FOR COMMUNICATING BETWEEN A MOBILE STATION AND A NETWORK USING ADDRESS ASSIGNMENT

BACKGROUND OF THE INVENTION

1. Field of the Invention

The present invention generally relates to a mobile communications system for performing mobile communications by means of switching, and in particular to a system and method for connecting the packet mobile communications system to the Internet.

2. Description of the Related Art

In general, to connect a mobile terminal to the Internet through a radio mobile communications network, the mobile terminal has an unique global IP (Internet Protocol) address for the Internet and an identification (ID) number for the mobile communication network assigned thereto. Further, since the mobile terminal moves from one location to another, it is necessary to identify the current location of the mobile terminal. To accomplish this, a location register is provided in the mobile communication system. When the mobile terminal moves to a new location, that is, a new cell, the location of the mobile terminal is registered in the location register through the new cell base station.

In the case where a packet addressed to the mobile terminal is received from the Internet, the location register is also used to transfer the received packet to the mobile terminal, resulting in increased load on the location register.

There has been disclosed a connection system for connecting a mobile unit to a network operating according to TCP/IP protocol in Japanese Patent Unexamined Publication No. 4-227149. More specifically, the system is provided with a global gateway to which a plurality of IP addresses are assigned. Depending on demand from a mobile unit, the global gateway dynamically assigns an available one of the IP addresses to the mobile unit. Therefore, the mobile unit temporarily possesses the IP address as necessary.

This system has an advantage that it is not necessary to assign an unique IP address to each mobile terminal. However, when receiving a packet addressed to the mobile unit from the Internet, the location register will be also used to identify where the mobile unit is currently located. Therefore, the load on the location register is increased.

SUMMARY OF THE INVENTION

An object of the present invention is to provide an internet communication system and method which can achieve the decreased number of IP addresses which are required in the Internet.

Another object of the present invention is to provide an internet communication system and method which can achieve the decreased load on connection control.

According to the present invention, in a communication method between a mobile station and a network which requires a unique network address for each terminal, the mobile station having an identification number assigned thereto in a mobile communications system including a plurality of mobile communication switching devices, the method comprising the steps of a) instructing the mobile station which has transmitted a communication request signal to a mobile communication switching device to use a private address as a source address of an outgoing signal, wherein the private address is selected from a group of private addresses uniquely assigned to the mobile communication switching device; b) converting the private address to a unique network address as a source address to transmit the outgoing signal to the network when receiving the outgoing signal having the private address as the source address; and c) storing a first correspondence of the private address and the identification number of the mobile station and a second correspondence of the private address and the unique network address so that the first and second correspondences are used to transfer an incoming signal from the network to the mobile station.

When transmitting an outgoing signal to the network, a private address is assigned to the mobile station which has transmitted the outgoing signal to a mobile communication switching device, wherein the private address is selected from a group of private addresses uniquely assigned to the mobile communication switching device. A first correspondence of the private address and the identification number of the mobile station is stored. After converting the private address to a unique network address as a source address, a second correspondence of the unique network address and the private address is stored.

When receiving an incoming signal from the network, the incoming signal having the unique network address as a destination address, the unique network address is converted to the private address according to the second correspondence, and the incoming signal is transferred to the mobile station through a mobile communication switching device based on the first correspondence. A first mobile communication switching device corresponding to the private address may be selected according to the first correspondence and the incoming signal is transferred to the first mobile communication switching device.

Subsequently, it is determined whether the mobile station can communicate with the first mobile communication switching device. When it is determined that the mobile station can communicate with the first mobile communication switching device, the incoming signal is transferred to the mobile station through the first mobile communication switching device.

When it is determined that the mobile station cannot communicate with the first mobile communication switching device, a second mobile communication switching device which can currently communicate with the mobile station is searched for. The incoming signal is transferred from the first mobile communication switching device to the second mobile communication switching device, and then is transferred from the second mobile communication switching device to the mobile station.

Since the private address is assigned to the mobile station when the communication is started, the decreased number of unique network addresses is achieved, because all the mobile stations hardly perform concurrent communications at a time.

The searching for the mobile station is performed over the mobile communication switching devices when it is determined that the mobile station is not located in the relatively wide service area of the mobile communication switching device. Therefore, the number of times a location register is accessed is dramatically reduced.

BRIEF DESCRIPTION OF THE DRAWINGS

FIG. 4A is a diagram showing an example of a global IP—private IP address table of the internet connection device;

FIG. 6 is a diagram showing a packet originating sequence of the embodiment;

FIG. 8 is a diagram showing a packet receiving sequence of the embodiment when the packet mobile terminal is located in the same communication registration area as previously located;

FIG. 9 is a diagram showing a packet receiving sequence of the embodiment when the packet mobile terminal is located in a different communication registration area than previously located.

DETAILED DESCRIPTION OF THE PREFERRED EMBODIMENTS

System Configuration

Figure 1:
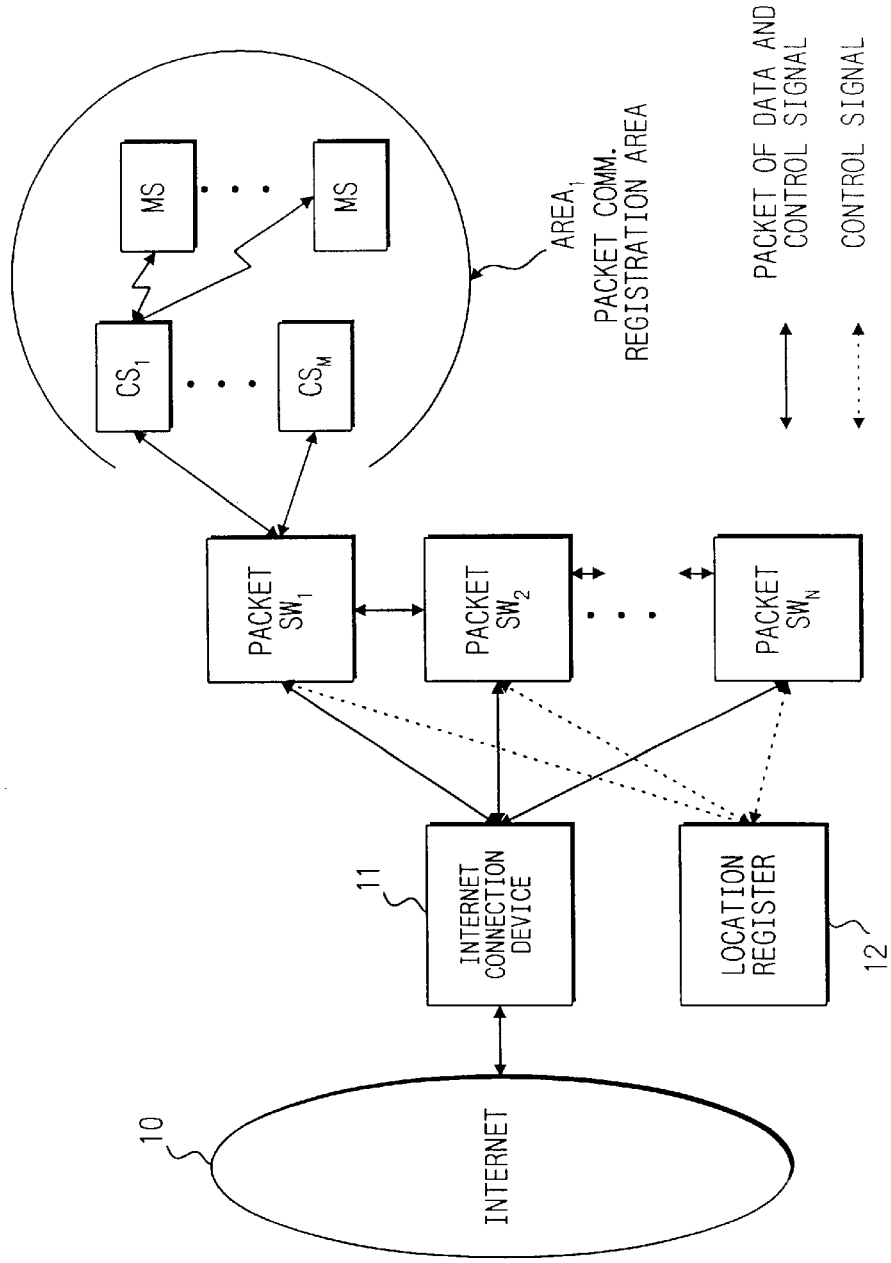
FIG. 1 is a schematic diagram showing an internet connection system according to an embodiment of the present invention.

Referring to FIG. 1, the Internet 10 is connected to an Internet connection device 11 which is further connected to a plurality of packet switching devices $SW_1$–$SW_N$. The packet switching devices $SW_1$–$SW_N$ are directly or indirectly connected to each other and each of them is connected to a location register 12 which stores the location information of each mobile station.

Each of the packet switching devices $SW_1$–$SW_N$ accommodates a plurality of packet base stations each forming a radio zone allowing two-way communications with a mobile station. The radio zones of the packet base stations are arranged in cellular form to produce a service area which is a packet communications registration area AREA for each packet switching device. For example, the packet switching device $SW_1$ accommodates packet base stations $CS_1$–$CX_M$ which form packet communications registration area $AREA_1$. When the mobile station moves from a radio zone to another, the location of the mobile station is registered in the location register 12. Therefore, the location register 12 is updated when each mobile station moves over radio zones.

In the above system configuration, an identification (ID) number is previously assigned to each packet mobile station MS and a different group of predetermined private IP addresses is previously assigned to each packet switching device. Conversely, a private IP address identifies the corresponding packet switching device.

Further, the Internet connection device 11 has the following functions: 1) packet transfer function of transferring a packet between the Internet and each of the packet switching device; 2) global IP address assignment function; 3) global IP address conversion function; and 4) private IP address group recognizing function.

Each packet switching device ($SW_1$–$SW_N$) has the following functions: 1) packet switching function; 2) private IP address assignment function; 3) packet transfer function of transferring a packet to another packet switching device; and 4) determination function of determining whether a packet mobile station is located in the packet communications registration area AREA thereof.

When a packet switching device receives a control packet having an ID number as a source ID from a packet-mobile station located in the packet communications registration area AREA thereof, the packet switching device selects one of the previously assigned private IP addresses and assigns the selected private IP address to the mobile station which has transmitted the control packet. When receiving the private IP address, the mobile station transmits an outgoing packet having the private IP address as a source ID. The packet switching device stores the correspondence of the selected private IP address and the ID number of the packet mobile station.

Further, the Internet connection device 11 assigns a global IP address to the outgoing packet which has the selected private IP address assigned thereto and stores the correspondence of the selected private IP address and the global IP address.

When receiving an IP packet (hereinafter, incoming packet) from the Internet 10, the Internet connection device 11 converts the incoming packet from the global IP address to the corresponding private IP address referring to the correspondence of the selected private IP address and the global IP address. Since the private IP address identifies the corresponding packet switching device, the incoming packet can be transferred to the corresponding packet switching device without referring to the location register 12.

Further, the packet switching device which receives the incoming packet converts it from the private IP address to the corresponding ID number referring to the correspondence of the selected private IP address and the ID number of the packet mobile station. In this manner, the incoming packet can be transferred to the packet mobile station located in the packet communication registration area AREA.

In the case where the addressed mobile station has gone to another packet communication registration area AREA, the packet switching device accesses to the location register 12 to obtain the current packet communication registration area. And the incoming packet is transferred to the packet switching device of the current packet communication registration area.

Hereinafter, "incoming packet" is defined as a packet received from the Internet 10 and "outgoing packet" as a packet transmitted to the Internet 10.

Internet Connection Device

Figure 2:
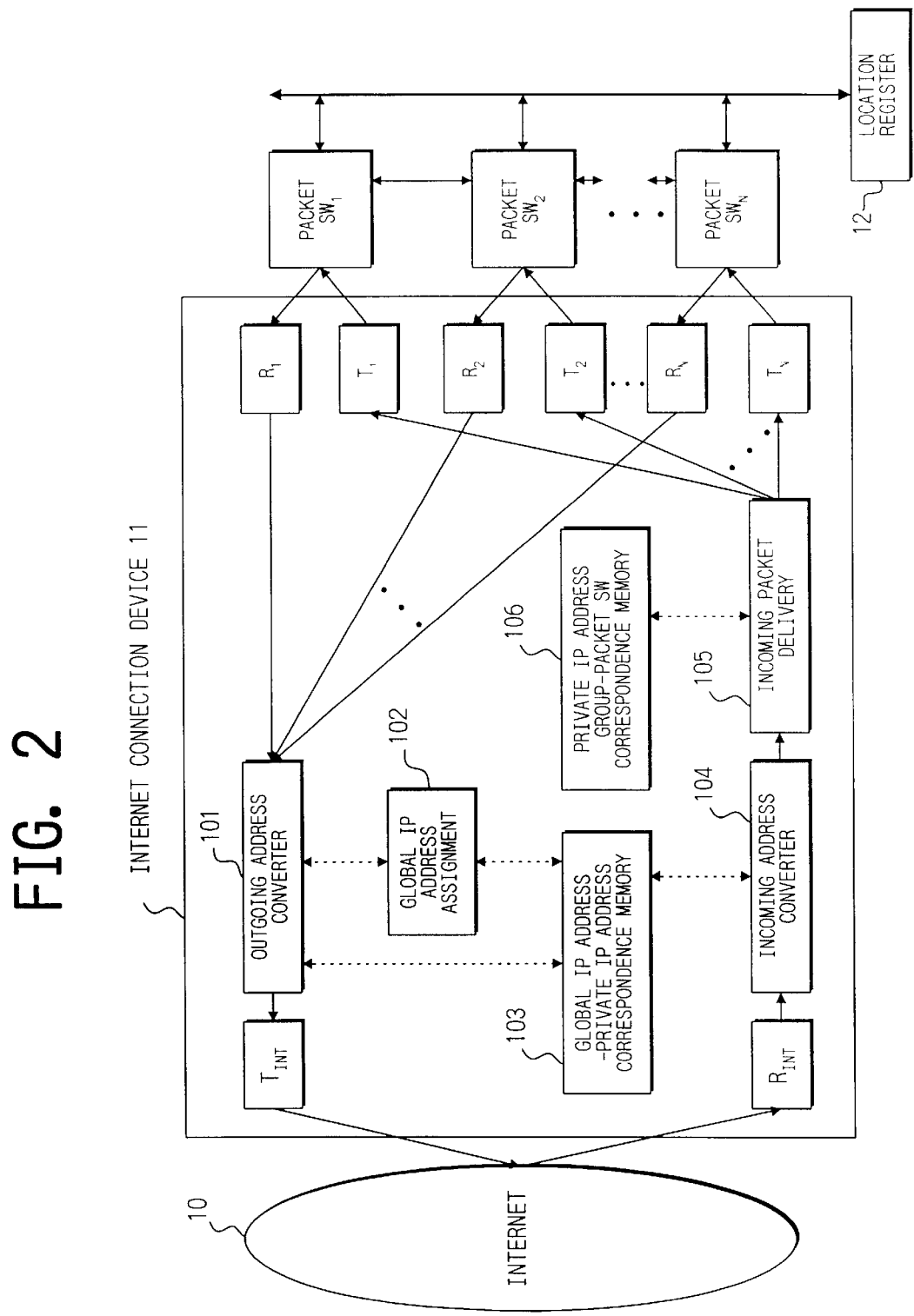
FIG. 2 is a block diagram showing an internet connection device in the embodiment.

Referring to FIG. 2, the Internet connection device 11 is provided with a packet receiver $R_{INT}$ and a packet transmitter $T_{INT}$ which are connected to the Internet 10. The packet receiver and transmitter $R_{INT}$ and $T_{INT}$ receives and transmits an IP packet having a global IP address according to the IP protocol as a destination address and a source address, respectively. The Internet connection device 11 is further provided with N pairs of packet receiver and transmitter devices, $R_1$ and $T_1$, $R_2$ and $T_2$, ..., $R_N$ and $T_N$, which are connected to the packet switching devices $SW_1$–$SW_N$, respectively. Each packet receiver R receives an IP packet having a private IP address from a corresponding packet switching device and each packet transmitter T transmits it to the corresponding packet switching device. The number of pairs of packet receiver and transmitter devices is equal or greater than that of the packet switching devices.

The packet receivers $R_1$–$R_N$ are connected to an outgoing address converter 101 which converts the source address of an outgoing packet from the private IP address to a global IP address. The outgoing packet having the global IP address is transmitted to the Internet 10 by the packet transmitter $T_{INT}$.

Since the first outgoing packet has no global IP address assigned thereto, a global IP address assignment section 102 assigns the global IP address to the first outgoing packet. The correspondence of the private IP address and the assigned global IP address is stored together with the destination global IP address onto a global IP address-private IP address correspondence memory 103. The global IP address-private IP address correspondence memory 103 is used to convert the outgoing address of an outgoing packet by the outgoing address converter 101.

When receiving an incoming IP packet from the Internet 10, the packet receiver $R_{INT}$ transfers it to an incoming address converter 104 which converts the incoming address of the incoming packet from the global IP address to a private IP address by referring to the global IP address-private IP address correspondence memory 103.

The incoming IP packet having the private IP address as a destination address is output to an incoming packet delivery section 105 which delivers the incoming IP packet to a selected packet switching device through the corresponding packet transmitter referring to a private IP address group-packet SW correspondence memory 106. As described before, since a different group of predetermined private IP addresses is previously assigned to each packet switching device, a private IP address identifies the corresponding packet switching device. Therefore, when receiving the incoming IP packet having the private IP address, the incoming packet delivery section 105 identifies the corresponding switching device by referring to the private IP address group-packet SW correspondence memory 106.

As described above, among various functions of the Internet connection device 11, address conversion function, address assignment function, address storage function and packet delivery function are particularly important. The address conversion function is implemented by the outgoing address converter 101 and the incoming address converter 104. The address assignment function is implemented by the global IP address assignment section 102. The address storage function is implemented by the global IP address-private IP address correspondence memory 103 and the private IP address group-packet SW correspondence memory 106. And, the packet delivery function is implemented by the incoming packet delivery section 105.

Packet Switching Device

Figure 3:
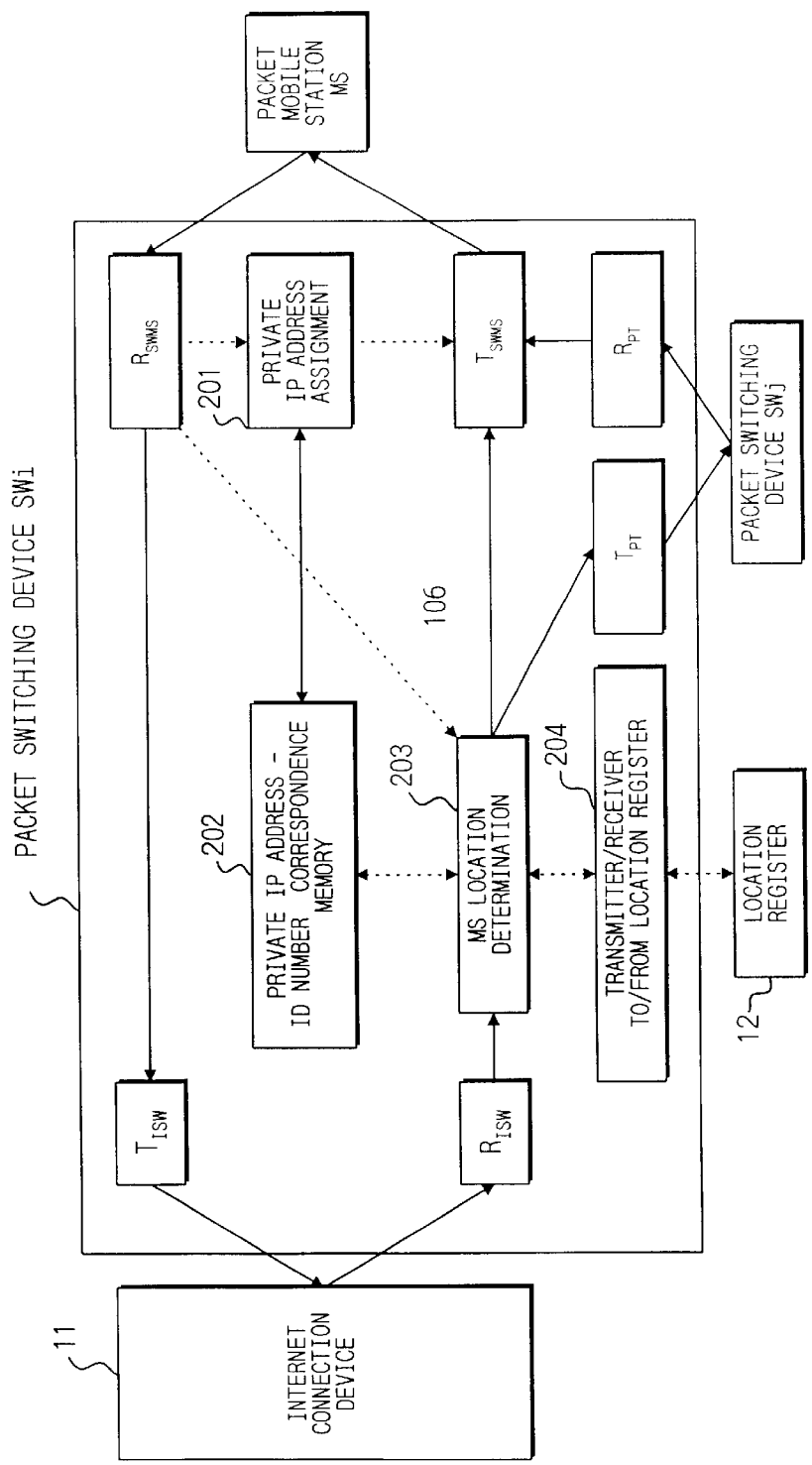
FIG. 3 is a block diagram showing a packet switching system in the embodiment.

Referring to FIG. 3, a packet switching device $SW_1$ is provided with a packet receiver $R_{ISW}$ and a packet transmitter $T_{ISW}$ which are connected to the Internet connection device 11. The packet receiver $R_{ISW}$ receives an IP packet having a private IP address as a destination address according to the IP protocol or another protocol used in the network. The packet transmitter $T_{ISW}$ transmits an outgoing IP packet having an assigned private IP address as a source address.

The packet switching device $SW_1$ is further provided with packet receiver and transmitter $R_{SWMS}$ and $T_{SWMS}$ which are connected to a packet mobile station MS according to a radio transmit/receive protocol. The packet receiver $R_{SWMS}$ receives a control packet having an ID number or an outgoing packet having a private IP address as a source address from the packet mobile station MS. The packet transmitter $T_{SWMS}$ transmits a control packet having a selected private IP address or an incoming packet having the ID number as a destination address.

When receiving a control packet having the ID number at the first time, the ID number is transferred from the packet receiver $R_{SWMS}$ to a private IP address assignment section 201. The private IP address assignment section 201 selects an available one of the previously assigned private IP addresses and transmits it back to the packet mobile station MS through the packet transmitter $T_{SWMS}$. Further, the correspondence of the assigned private IP address and the ID number of the mobile station MS is stored onto a private IP address-ID number correspondence memory 202. When receiving an outgoing packet having the private IP address as a source address, the outgoing packet is transmitted from the packet transmitter $T_{ISW}$ to the Internet connection device 11.

Furthermore, when receiving a packet from the packet mobile station MS, an MS location determination section 203 determines that the packet mobile station MS is located within the packet communication registration area AREA thereof and transmits the location information of the mobile station MS to the location register 12 through a location register transmitter/receiver 204. If neither control packet nor outgoing packet is received from the mobile station MS during a predetermined time period, the MS location determination section 203 determines that the mobile station MS has left the packet communication registration area AREA thereof and then inquires the location register 12 of location information of that mobile station MS.

The mobile station MS has a function of transmitting a packet having the received private IP address as the source address to the packet switching device through a base station.

On the other hand, when receiving an incoming packet having the private IP address as a destination address from the Internet connection device 11, the packet receiver $R_{ISW}$ transfers it to the MS location determination section 203. The MS location determination section 203, referring to the private IP address-ID number correspondence memory 202, determines whether the mobile station MS having the ID number corresponding to the private IP address is currently located in the self service area.

If it is determined that the mobile station MS corresponding to the private IP address is currently located in the self service area, the incoming packet is transmitted to the mobile station MS through the packet transmitter $T_{SWMS}$. If it is determined that the mobile station MS corresponding to the private IP address is not located in the self service area, the MS location determination section 203 inquires the location register 12 of the location information of the mobile station MS and then transfers the incoming packet to other packet switching device $SW_j$ through a packet transmitter $T_{PT}$. Conversely, there may be cases where an incoming packet addressed to a mobile station located in the self service area is received from another packet switching device through a packet receiver $R_{PT}$. Such a received incoming packet is also transmitted to that mobile station through the packet transmitter $T_{SWMS}$.

Correspondence Tables

Figure 4B:
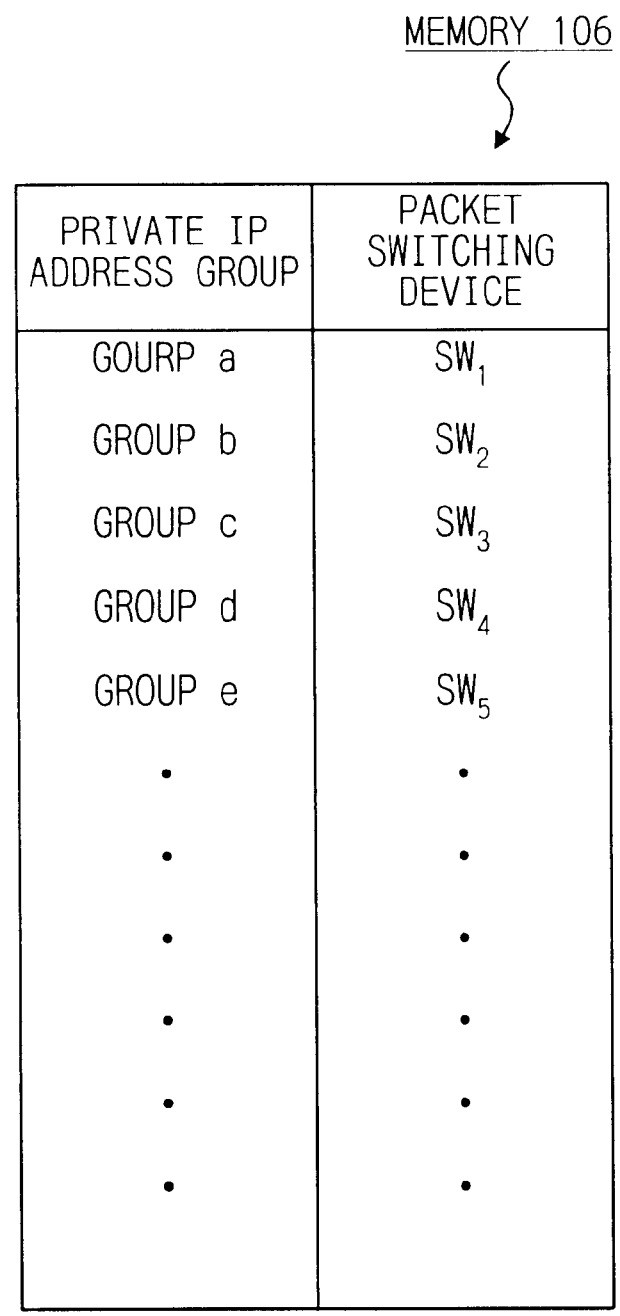
FIG. 4B is a diagram showing an example of a private IP—packet switching system table of the internet connection device.
Figure 4C:
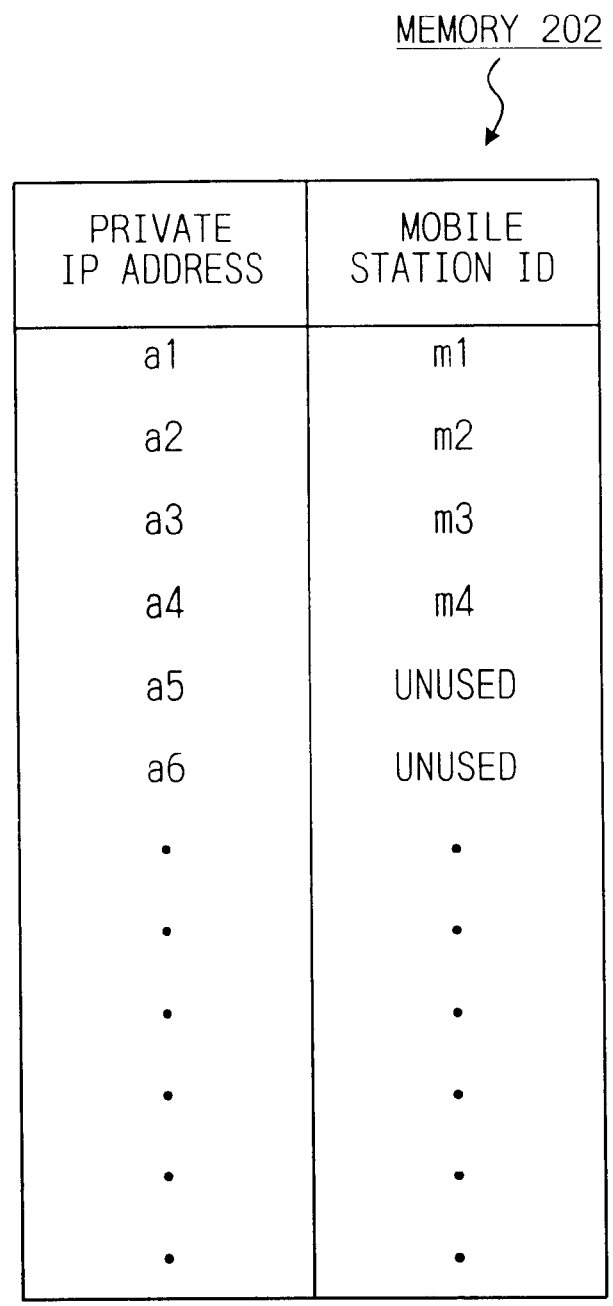
FIG. 4C is a diagram showing an example of a private IP—ID number table of the packet switching system.

For simplicity, it is assumed that the respective correspondence memories 103, 106 and 202 store correspondence tables as shown in FIGS. 4A–4C.

Referring to FIG. 4A, the global IP address-private IP address correspondence memory 103 stores the correspondence of global IP addresses and private IP addresses together with the corresponding destination global IP addresses (not shown). The number of global IP addresses previously assigned is not greater than that of mobile stations in the mobile communications system because the number of mobile stations concurrently requesting the Internet communication is probably smaller than that of the global IP addresses.

In this figure, three private IP addresses "a1", "a2" and "a3" of Group "a" are correspondent to global IP addresses "g1" "g2" and "g3", respectively. In this case, the global IP addresses "g10" and "g11" have not been used yet.

Referring to FIG. 4B, the private IP address group-packet SW correspondence memory 106 stores the correspondence of IP address groups "a", "b", . . . and packet switching devices $SW_1$, $SW_2$, . . . , respectively. For example, the private. IP address group "a" is correspondent to the packet switching device $SW_1$. Therefore, if an incoming packet having a private IP address of the Group "a" as a destination address is received, the incoming packet is automatically transferred to the packet switching device $SW_1$.

Referring to FIG. 4C, the private IP address-ID number correspondence memory 202 stores the correspondence of assigned private IP addresses and ID numbers of mobile stations located in the self service area. In the case of the packet switching device $SW_1$ to which the private IP address group "a" is previously assigned, for example, a selected private IP address "a1" of the Group "a" is assigned to the ID number "m1" of a mobile station accommodated therein. In this case, the private IP addresses "a5" and "a6" have not been used yet.

Transmitting Operation

Figure 5A:
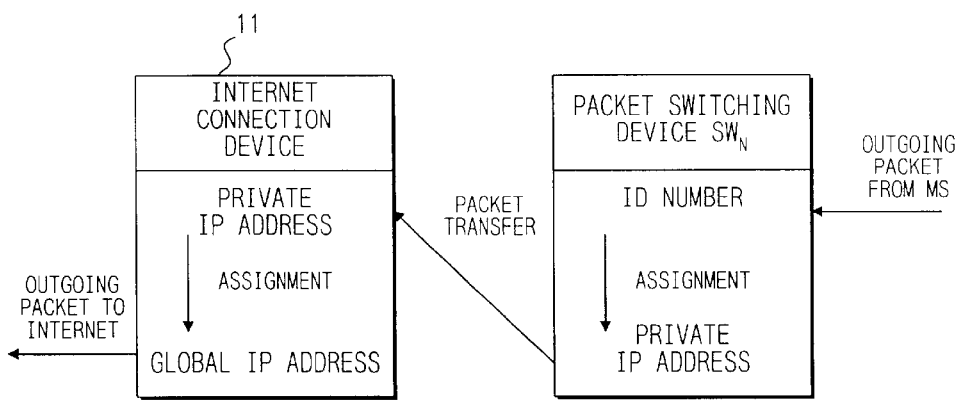
FIG. 5A is a schematic flowchart showing a packet originating operation of the embodiment.
Figure 5B:
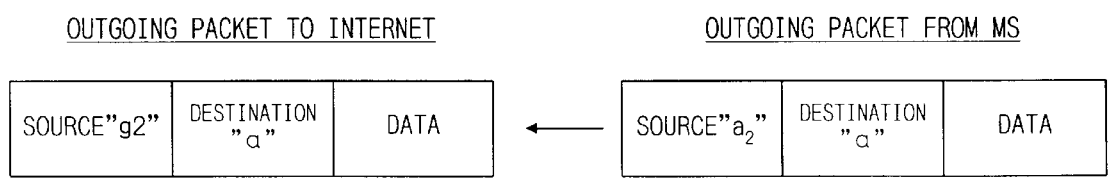
FIG. 5B is a diagram showing an example of IP address change in the packet originating operation of FIG. 5A.

Referring to FIGS. 5A and 5B, in the case of packet originating, the packet switching device SW1 assigns a selected private IP address to the ID number of the originating mobile station MS referring to the private IP address-ID number correspondence memory 202.

Subsequently, the Internet connection device 11 assigns a global IP address to the private IP address referring to the global IP address-private IP address correspondence memory 103. For example, as shown in FIG. 5B, the source address "a2" of an outgoing packet received from the packet switching device SW1 is converted to a global IP address "g2".

The details of transmitting operation will be described hereinafter referring to FIG. 6.

As shown in FIG. 6, when a mobile station MS transmits a communication originating request to a packet switching device SW (S13-1), the packet switching device SW transfers the communication originating request to the private IP address assignment section 201 and the MS location determination section 203.

The MS location determination section 203 determines that the mobile station MS is located within the service area thereof for the first time and transmits the location information of the mobile station MS to the location register 12 which registers the packet communication registration area AREA of the mobile station (S13-2).

The private IP address assignment section 201 selects an available one of the previously assigned private IP addresses and transmits a control packet indicating the assignment of the private IP address back to the packet mobile station MS through the packet transmitter $T_{SWMS}$ (S13-3). Further, the correspondence of the assigned private IP address and the ID number of the mobile station MS is stored onto the private IP address-ID number correspondence memory 202.

When the mobile station MS transmits an outgoing packet having the private IP address as a source address (S13-4), the packet switching device SW transmits the outgoing packet to the Internet connection device 11 (S13-5).

In the Internet connection device 11, the outgoing address converter 101 converts the source address of the outgoing packet from the private IP address to a global IP address referring to the global IP address-private IP address correspondence memory 103. The outgoing packet having the global IP address as the source address is transmitted to the Internet 10 (S13-6).

When a first packet is transmitted, since the 10 outgoing packet has no global IP address assigned thereto, the global IP address assignment section 102 assigns the global IP address to the first outgoing packet. The correspondence of the private IP address and the assigned global IP address is stored together with the destination global IP address onto the global IP address-private IP address correspondence memory 103.

Receiving Operations

Figures 7A, 7B:
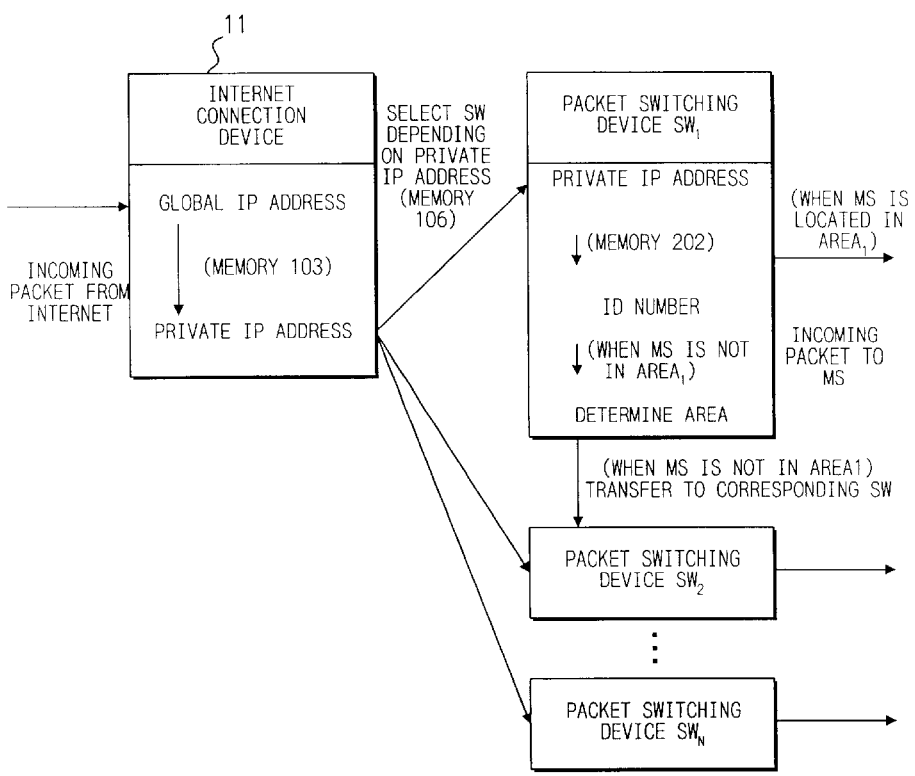
FIG. 7A is a schematic flowchart showing a packet receiving operation of the embodiment.
FIG. 7B is a diagram showing an example of IP address change in the packet receiving operation of FIG. 7A.

Referring to FIGS. 7A and 7B, in the case of packet receiving, the internet connection device 11 converts the destination address of the incoming packet from the Internet 10 from the global IP address to the corresponding private IP address referring to the global IP address-private IP address correspondence memory 103. For example, as shown in FIG. 7B, the destination address "g2" of the incoming packet received from the Internet is converted to the private IP address "a2".

Since the private IP address identifies the corresponding packet switching device referring to the private IP address group-packet SW correspondence memory 106, the incoming packet is transferred to the corresponding packet switching device.

In the corresponding packet switching device, if the mobile station having the ID number corresponding to the private IP address is located in the service area of the corresponding packet switching device, the incoming packet is transmitted to the mobile station MS.

On the other hand, if the mobile station is out of the service area of the corresponding packet switching device, the location register 12 is inquired of the location information of the mobile station MS. If the mobile station MS is currently located in the service area of another packet switching device, then the incoming packet is transferred to the other packet switching device.

Direct Receiving Operation

The details of direct receiving operation when a destination mobile station is located in the initial service area will be described hereinafter referring to FIG. 8.

As shown in FIG. 8, when receiving an incoming IP packet addressed to a mobile station MS from the Internet 10 (S14-1), the Internet connection device 11 converts the destination address of the incoming packet from the global IP address to a private IP address by referring to the global IP address-private IP address correspondence memory 103.

The incoming packet having the private IP address as a destination address is transferred to an incoming packet delivery section 105. Since the private IP address identifies the corresponding packet switching device, the incoming packet delivery section 105 delivers the incoming packet to a selected packet switching device referring to a private IP address group-packet SW correspondence memory 106 (S14-2).

In the packet switching device receiving the incoming packet, the MS location determination section 203, referring to the private IP address-ID number correspondence memory 202, determines whether the mobile station MS having the ID number corresponding to the private IP address is currently located in the self service area.

If it is determined that the mobile station MS corresponding to the private IP address is currently located in the self service area, the incoming packet is transmitted to the mobile station MS through the packet transmitter $T_{SWMS}$ (S14-3).

Indirect Receiving Operation

The details of indirect receiving operation when a destination mobile station is out of the initial service area will be described hereinafter referring to FIG. 9. For simplicity, it is assumed that the private IP address is correspondent to the packet switching device SW, and the destination mobile station MS is not currently located in the initial service area but another service area of the packet switching device $SW_2$.

As shown in FIG. 9, the sequence steps S15-1 and S15-2 are the same as the steps S14-1 and S14-2 of FIG. 8.

In the packet switching device $SW_1$ receiving the incoming packet, when the MS location determination section 203 determines that the mobile station MS corresponding to the private IP address is not located in the self service area, the MS location determination section 203 inquires the location register 12 of the location information of the mobile station MS (S15-3).

When receiving the packet communication registration area $AREA_2$ where the destination mobile station MS is currently located (S15-4), the incoming packet is transfers to the other packet switching device $SW_2$ through the packet transmitter $T_{PT}$ (S15-5).

The packet switching device $SW_2$ receiving the incoming packet from the packet switching device $SW_1$ transmits the incoming packet to that mobile station through the packet transmitter $T_{SWMS}$ (S15-6).

Another Embodiment

Figure 10:
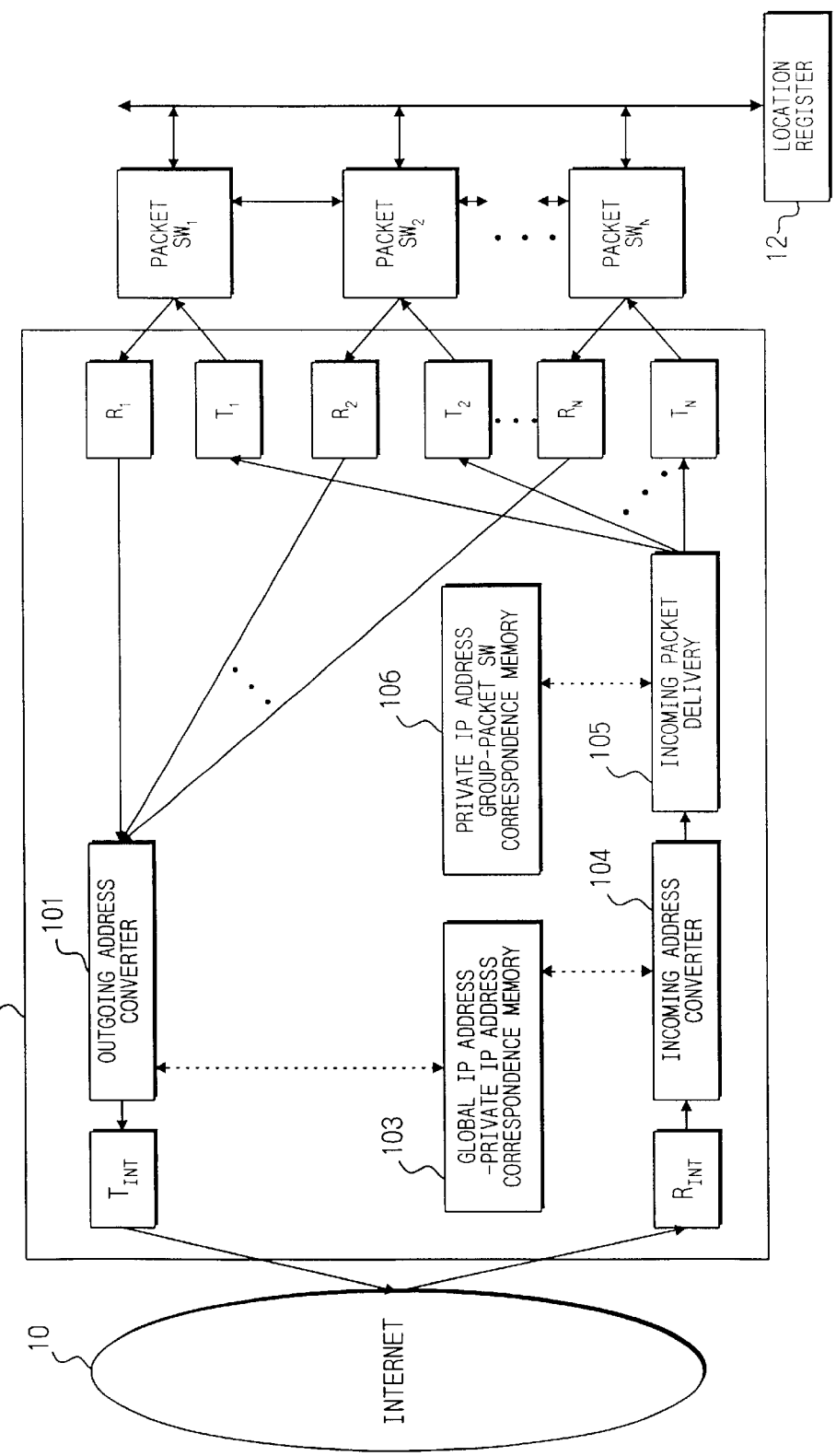
FIG. 10 is a block diagram showing an internet connection device according to another embodiment of the present invention.

FIG. 10 shows another example of the Internet connection device 11, where blocks similar to those previously described with reference to FIG. 2 are denoted by the same reference numerals and the descriptions are omitted. In this embodiment, all the assigned global IP addresses are correspondent to all the assigned private IP addresses, respectively. Therefore, the global IP address assignment section 102 may be omitted in this embodiment. The global IP address assignment section 102 assigns the global IP address to the first outgoing packet.

What is claimed is:

1. A communication method between a mobile station and a network which requires a unique network address for each terminal, the mobile station having an identification number assigned thereto in a mobile communications system including a plurality of mobile communication switching devices, the method comprising the steps of:

in response to a communication request signal,
   a) assigning a private address to the mobile station which has transmitted an outgoing signal to a mobile communication switching device, wherein the private address is selected from a group of predetermined private addresses uniquely assigned to the mobile communication switching device;
   b) storing a first correspondence of the private address and the identification number of the mobile station, when transmitting the outgoing signal to the network,
   c) converting the private address to a unique network address as a source address; and
   d) storing a second correspondence of the unique network address and the private address, and when receiving an incoming signal from the network, the incoming signal having the unique network address as a destination address,
   e) converting the unique network address to the private address according to the second correspondence; and
   f) transferring the incoming signal to the mobile station through a mobile communication switching device based on the first correspondence, wherein the step f) comprises the steps of:
      selecting a first mobile communication switching device corresponding to the private address according to the first correspondence;
      transferring the incoming signal to the first mobile communication switching device;
      determining whether the mobile station can communicate with the first mobile communication switching device;
      transferring the incoming signal to the mobile station through the first mobile communication switching device when it is determined that the mobile station can communicate with the first mobile communication switching device;
      searching for a second mobile communication switching device which can currently communicate with the mobile station when it is determined that the mobile station cannot communicate with the first mobile communication switching device;
      transferring the incoming signal from the first mobile communication switching device to the second mobile communication switching device; and
      transferring the incoming signal from the second mobile communication switching device to the mobile station.

2. The communication method according to claim 1, wherein the incoming signal is transferred from the first mobile communication switching device to the second mobile communication switching device without accessing a table outside of the first mobile communication switching device.

3. A communication method between a mobile station and a network which requires a unique network address for each terminal, the mobile station having an identification number assigned thereto in a mobile communications system including a plurality of mobile communication switching devices, the method comprising the steps of:

in response to a communication request signal,
   a) instructing the mobile station which has transmitted the communication request signal to a mobile communication switching device to use a private address as a source address of an outgoing signal, wherein the private address is assigned to the mobile station and is selected from a group of predetermined private addresses uniquely assigned to the mobile communication switching device;

when transmitting the outgoing signal to the network,
- b) converting the private address to a unique network address as the source address to transmit the outgoing signal to the network when receiving the outgoing signal having the private address as the source address;
- c) storing a first correspondence of the private address and the identification number of the mobile station and a second correspondence of the private address and the unique network address so that the first and second correspondences are used to transfer an incoming signal from the network to the mobile station;
- d) receiving the incoming signal having a unique network address as a destination address from the network;
- e) selecting a first mobile communication switching device corresponding to a private address determined from the unique network address according to the second correspondence;
- f) transferring the incoming signal to the first mobile communication switching device;
- g) determining whether the mobile station can communicate with the first mobile communication switching device;
- h) transferring the incoming signal to the mobile station through the first mobile communication switching device when it is determined that the mobile station can communicate with the first mobile communication switching device;
- i) searching for a second mobile communication switching device which can currently communicate with the mobile station when it is determined that the mobile station cannot communicate with the first mobile communication switching device;
- j) transferring the incoming signal from the first mobile communication switching device to the second mobile communication switching device; and
- k) transferring the incoming signal from the second mobile communication switching device to the mobile station.

4. The communication system according to claim 3, further comprising:
- a location register connected to the mobile communication switching devices, for registering location information of the mobile station,
- wherein each of the mobile communication switching devices comprises:
  - a transfer controller for transferring the incoming signal to a selected mobile station and to another mobile communication switching device depending on whether the mobile station is located in the communications service area thereof.

5. The communication system according to claim 4, wherein the transfer controller determines whether the selected mobile station is located in a first communications service area of a first mobile communication switching device, wherein if it is determined that the selected mobile station is located in the first communications service area, then the transfer controller transfers the incoming signal to the selected mobile station through the first mobile communication switching device, and, if it is determined that the selected mobile station is not located in the first communications service area, then the transfer controller searches the location register for a second communications service area of a second mobile communication switching device and then transfers the incoming signal from the first mobile communication switching device to the second mobile communication switching device, and transfers the incoming signal from the second mobile communication switching device to the selected mobile station.

6. The communication method according to claim 3, wherein the incoming signal is transferred from the first mobile communication switching device to the second communication switching device without accessing a table outside of the first mobile communication switching device.

7. The communication system according to claim 4, wherein the transfer controller transfers the incoming signal to another mobile communication switching device without accessing a table outside of said each of the mobile communication switching devices.

* * * * *